(12) United States Patent
Nitschke

(10) Patent No.: US 6,189,649 B1
(45) Date of Patent: Feb. 20, 2001

(54) SOUNDPROOFING SYSTEM, AND A SOUNDPROOFING ELEMENT, FOR AN ELECTRICAL MACHINE

(75) Inventor: Thomas Nitschke, Alsheim (DE)

(73) Assignee: ABB Patent GmbH, Mannheim (DE)

( * ) Notice: Under 35 U.S.C. 154(b), the term of this patent shall be extended for 0 days.

(21) Appl. No.: 09/416,025

(22) Filed: Oct. 8, 1999

(30) Foreign Application Priority Data

Oct. 8, 1998 (DE) .............................................. 198 46 436

(51) Int. Cl.⁷ .................................................... G10K 11/04

(52) U.S. Cl. ............................ 181/200; 181/202; 181/204

(58) Field of Search ..................................... 181/200, 202, 181/204, 205, 207, 208, 290

(56) References Cited

FOREIGN PATENT DOCUMENTS 23 30 016 A1 1/1975 (DE) .
41 09 814 C2 4/1993 (DE) .

OTHER PUBLICATIONS

Helmuth Schmidt: "Möglichkeiten der Abwehr von Industrielärm" [potentials for defending against industrial noise], Wärme Kälte Schall 4–5/1961.
Siemens Publication: "Wasserkraftgeneratoren" [hydroelectric power generators].

*Primary Examiner*—Khanh Dang
(74) *Attorney, Agent, or Firm*—Herbert L. Lerner; Laurence A. Greenberg; Werner H. Stemer

(57) ABSTRACT

A soundproofing system is proposed for an electrical machine, in particular a generator. The soundproofing system has a plurality of airtight soundproofing elements mounted releasable attached in an airtight manner using seals and fasteners to a casing frame of the electrical machine. The casing frame being in the form of a framework of the electrical machine. The soundproofing element has a circumferential frame that has a U-shaped profile and is fitted on one side with a covering plate and on the opposite side with a perforated plate. A base surface of the frame governs a height of the soundproofing element. A side surface of the frame acts as a sealing surface with respect to the casing frame of the electrical machine, and the other side surface of the frame is used as a sealing surface for the covering plate. An airborne sound attenuator is inserted between the frame, the covering plate and the perforated plate. The covering plate is mounted in an airtight manner on the sealing surface of the frame.

9 Claims, 1 Drawing Sheet

SOUNDPROOFING SYSTEM, AND A SOUNDPROOFING ELEMENT, FOR AN ELECTRICAL MACHINE

BACKGROUND OF THE INVENTION

1. Field of the Invention

The invention relates to a soundproofing system for an electrical machine and to a soundproofing element for an electrical machine. The invention may be used, for example, for generators.

Electrical machines, for example generators, often have a casing in the form of a welded structure for carrying air. A soundproofing shroud, which is fitted over the electrical machine separately, is used for the soundproofing. The soundproofing shroud contains a framework composed of profile elements, which are placed on the machine foundation and are clad with soundproofing elements. The soundproofing is relatively complex and expensive due, in particular, to its separate framework. Furthermore, such soundproofing is also relatively voluminous, since it has to enclose the complete electrical machine, or the system with the electrical machine.

2. Summary of the Invention

It is accordingly an object of the invention to provide a soundproofing system, and a soundproofing element, for an electrical machine which overcomes the above-mentioned disadvantages of the prior art devices of this general type, which can be manufactured relatively economically and which requires little space. Furthermore, a soundproofing element is intended to be specified for the soundproofing system.

With the foregoing and other objects in view there is provided, in accordance with the invention, a soundproofing system for an electrical machine having a casing frame being a framework of the electrical machine, the soundproofing system includes a plurality of airtight soundproofing elements each having a side facing the casing frame; seals disposed on the side of the plurality of airtight soundproofing elements facing the casing frame for mounting the plurality of airtight soundproofing elements in an airtight manner to the casing frame; and fasteners disposed on the plurality of airtight soundproofing elements for directly and detachably mounting the plurality of airtight soundproofing elements on the casing frame.

The advantages that can be achieved by the invention are, in particular, that the proposed soundproofing system promotes a very compact construction for the electrical machine, or for the system containing this machine. There is no longer any need for a separate framework for a soundproofing shroud, which must enclose the electrical machine or the system in order to ensure soundproofing. In the same way, there is no physical separation between the "source of the noise" and the noise attenuation devices. Furthermore, no temporary soundproofing measures are required on the installation site either, which normally have to be provided until the actual soundproofing shroud is fitted.

With the foregoing and other objects in view there is further provided, in accordance with the invention, an airtight soundproofing element for a soundproofing system of an electrical machine having a casing frame, including:

a circumferential frame having a U-shaped profile with a base surface, a first side, and a second side opposite to the first side, the base surface governing a height of the airtight soundproofing element, the second side functioning as a first sealing surface with respect to the casing frame;

a covering plate mounted in an airtight manner on the first side of the circumferential frame, the first side functioning as a second sealing surface with respect to the covering plate;

a perforated plate disposed on the circumerential frame opposite the covering plate; and an airborne sound attenuator disposed between the circumferential frame, the covering plate and the perforated plate.

The use of the soundproofing elements which are mounted directly on the casing frame of the electrical machine results in the soundproofing and casing function being combined. The casing structure is simplified, since the casing of the electrical machine is reduced to the casing frame, which is in the form of a framework and is clad in an airtight manner by the soundproofing elements, which may be stiffened.

In this case, each soundproofing element can be fitted and removed independently of the adjacent soundproofing element. This has the advantage that virtually every point on the electrical machine is freely accessible for maintenance work, after removal of the relevant soundproofing elements.

Other features which are considered as characteristic for the invention are set forth in the appended claims.

Although the invention is illustrated and described herein as embodied in a soundproofing system, and a soundproofing element, for an electrical machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
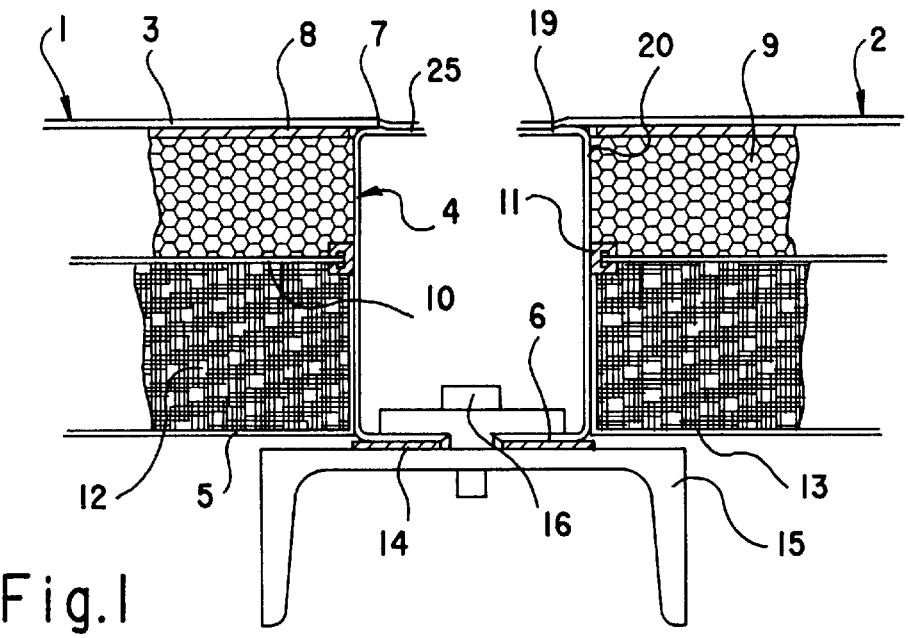
FIG. 1 is a diagrammatic, sectional view through two soundproofing elements that are mounted on a casing frame of an electrical machine according to the invention.

In all the figures of the drawing, sub-features and integral parts that correspond to one another bear the same reference symbol in each case. Referring now to the figures of the drawing in detail and first, particularly, to FIG. 1 thereof, there is shown a section through two soundproofing elements 1, 2 which are mounted on a casing frame 15 of an electrical machine. Although the two soundproofing elements 1, 2 are in principle configured in the same way, their length and width correspond to the dimensions predetermined by the installation location on the casing frame 15 of the electrical machine. In this case, there is no need whatsoever for the external shape of the respective soundproofing element 1, 2 to be rectangular (as is shown, by way of example, in FIG. 2), since it is better for it to conform to the contour predetermined by the profile of the casing frame 15.

The following text describes the basic configuration of each of the soundproofing elements 1, 2. Each of the soundproofing elements 1, 2 contains a circumferential frame 4 (side plate), which has a U-shaped profile and is fitted on one side with a covering plate 3 (outer plate) and on the opposite side with a perforated plate 5 (inner plate). A base surface 20 of the frame 4 governs a height of the soundproofing elements 1, 2, a side surface 6 of the frame 4 acts as a sealing surface with respect to the casing frame 15 of the electrical machine, and the other side surface of the frame 4 is used as a sealing surface 19 for the covering plate 3.

The perforated plate 5 is bent over as a box and is connected to the frame 4, preferably by spot welds. A particle barrier 13 (i.e. a glass matting) and an airborne sound attenuator 12 (i.e. a mineral fiber) are then inserted into the frame 4 with the perforated plate 5. The soundproofing can be improved by fitting an intermediate plate 10 and a further airborne sound attenuation layer 9 (i.e. a mineral fiber). The intermediate plate 10 is supported by an elastic mounting 11 (rubber mounting) on the base surface 20 of the frame 4.

The covering plate 3 is finally mounted in an airtight manner on the sealing surface 19 of the frame 4, by rivets 25 or spot welding sealed using an elastic bonding layer 7. On its inner surface, the covering plate 3 is provided with a reverberation suppression device 8, which is used to attenuate structure-born sound.

The individual soundproofing elements 1, 2 constructed in such a way are mounted on the casing frame 15 of the electrical machine using suitable screw attachments 16. In this case, a flat seal 14 which is inserted between the casing frame 15 and the sealing surface 6 of the frame 4 is used to provide an airtight seal between an interior of the electrical machine and the outside atmosphere.

Figure 2:
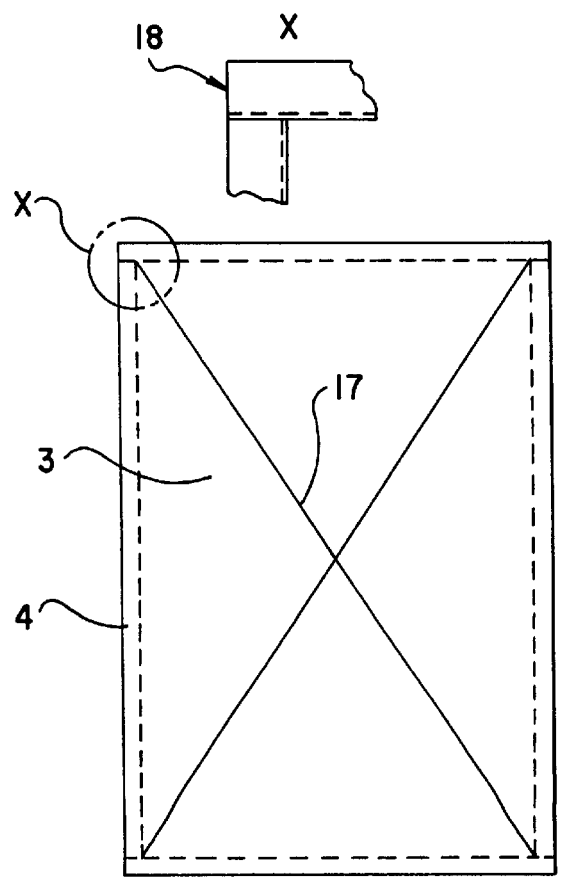
FIG. 2 is a top plan view of an outer surface of a soundproofing element.

FIG. 2 shows a view of the outer surface of the soundproofing element 1. As can be seen, the covering plate 3 is stiffened by a cross-bracing 17. An apex of the cross-bracing 17 in this case points towards a high-pressure side. The refinement of the soundproofing element 1 is required for an electrical machine that is internally pressurized, and ensures that the soundproofing is mechanically robust. Appropriately dimensioned webs may also be used to stiffen the covering plate 3.

The detail x of the soundproofing element 1, which is illustrated enlarged, shows the possible configuration of a frame corner 18 of the frame 4.

I claim:

1. An airtight soundproofing element for a soundproofing system of an electrical machine having a casing frame, comprising:

a circumferential frame having a U-shaped profile with a base surface, a first side, and a second side opposite to said first side, said base surface governing a height of the airtight soundproofing element, said second side functioning as a first sealing surface with respect to the casing frame;

a covering plate mounted in an airtight manner on said first side of said circumferential frame, said first side functioning as a second sealing surface with respect to said covering plate;

a perforated plate disposed on said circumerential frame opposite said covering plate; and an airborne sound attenuator disposed between said circumferential frame, said covering plate and said perforated plate.

2. The airtight soundproofing element according to claim 1, wherein said perforated plate is bent over as a box and is attached to said circumferential frame by spot welds.

3. The airtight soundproofing element according to claim 1, including an elastic bonding layer disposed between said covering plate and said second sealing surface of said circumferential frame for providing an air tight seal between said circumferential frame and said covering plate.

4. The airtight soundproofing element according to claim 1, including:

an elastic mounting disposed on said base surface of said circumferential frame; and an intermediate plate disposed parallel to said covering plate and said perforated plate and supported via said elastic mounting.

5. The airtight soundproofing element according to claim 1, wherein said covering plate has an inner surface and including a reverberation suppressor disposed on said inner surface.

6. The airtight soundproofing element according to claim 1, wherein said covering plate has a stiffening device.

7. The airtight soundproofing element according to claim 6, wherein said stiffening device is a cross-bracing.

8. The airtight soundproofing element according to claim 3, wherein said covering plate is spot welded to said second sealing surface of said circumferential frame.

9. The airtight soundproofing element according to claim 3, including rivets for riveting said covering plate to said second sealing surface.

* * * * *